United States Patent
Balter et al.

(10) Patent No.: US 12,185,897 B2
(45) Date of Patent: Jan. 7, 2025

(54) SYSTEM AND METHOD FOR DRIVING A POWER TOOL INTO A SUBSTRATE USING A NEGATIVE PRESSURE PRODUCED BY A SUCTION DEVICE

(71) Applicant: Hilti Aktiengesellschaft, Schaan (LI)

(72) Inventors: Marco Balter, Feldkirch (AT); Hans-Joerg Rieger, Thueringen (AT)

(73) Assignee: Hilti Aktiengesellschaft, Schaan (LI)

( * ) Notice: Subject to any disclaimer, the term of this patent is extended or adjusted under 35 U.S.C. 154(b) by 215 days.

(21) Appl. No.: 17/632,720

(22) PCT Filed: Jul. 27, 2020

(86) PCT No.: PCT/EP2020/071106
§ 371 (c)(1),
(2) Date: Feb. 3, 2022

(87) PCT Pub. No.: WO2021/023543
PCT Pub. Date: Feb. 11, 2021

(65) Prior Publication Data
US 2022/0279997 A1    Sep. 8, 2022

(30) Foreign Application Priority Data

Aug. 8, 2019  (EP) .................................. 19190717

(51) Int. Cl.
*A47L 7/00* (2006.01)
*A47L 9/28* (2006.01)
*B23B 47/28* (2006.01)

(52) U.S. Cl.
CPC ........... *A47L 7/0085* (2013.01); *A47L 7/0095* (2013.01); *A47L 9/2894* (2013.01); *B23B 47/287* (2013.01); *B23B 2251/68* (2013.01)

(58) Field of Classification Search
CPC ..... A47L 7/0085; A47L 7/0095; B23B 47/287
USPC .............................................................. 173/1
See application file for complete search history.

(56) References Cited

U.S. PATENT DOCUMENTS

| | | | | |
|---|---|---|---|---|
| 2,906,256 A | * | 9/1959 | Glynn | B23Q 11/1007 408/58 |
| 4,622,780 A | * | 11/1986 | Tingley | B24B 55/102 451/87 |
| 5,356,245 A | * | 10/1994 | Hosoi | B23Q 11/006 408/67 |
| 5,445,558 A | * | 8/1995 | Hutchins | B24B 55/12 451/344 |
| 2016/0100724 A1 | | 4/2016 | Valentini | |

(Continued)

FOREIGN PATENT DOCUMENTS

EP    2 196 282 A1    6/2010

OTHER PUBLICATIONS

PCT/EP2020/071106, International Search Report dated Oct. 19, 2020 (Two (2) pages).

*Primary Examiner* — Robert F Long
*Assistant Examiner* — Xavier A Madison
(74) *Attorney, Agent, or Firm* — Crowell & Moring LLP

(57) ABSTRACT

A system includes a power tool and a suction device that is connected to the power tool via a suction hose. The power tool is drivable into a wall or into a substrate by a negative pressure produced by the suction device. A method includes driving the power tool into the wall or into the substrate by using the negative pressure produced by the suction device that is connected to the power tool via the suction hose.

13 Claims, 3 Drawing Sheets

(56) References Cited

U.S. PATENT DOCUMENTS

2018/0326507 A1* 11/2018 Halvorsen ............... B23B 39/08
2020/0306907 A1* 10/2020 Iida .................... B23Q 11/0071

* cited by examiner

SYSTEM AND METHOD FOR DRIVING A POWER TOOL INTO A SUBSTRATE USING A NEGATIVE PRESSURE PRODUCED BY A SUCTION DEVICE

BACKGROUND AND SUMMARY OF THE INVENTION

The present invention relates to a system which comprises a power tool and a suction device. With the system it is possible to drive a tool of the power tool into the wall or into the substrate (cut assist function) The cut assist function may also be referred to in the context of the invention as assisted or automatic drilling. The negative pressure may also be used to press the power tool against the substrate in such a way that a user only has to exert a small amount of force to keep the power tool in a working position.

Also disclosed are a method and a use of a negative pressure produced by a suction device for driving a power tool or a tool of the power tool into a wall or into a substrate.

In the field of power tools, in particular in the case of core drilling devices, which can be equipped for example with diamond-tipped drill bits, it is known to operate the power tools in connection with an automatic feed device (auto feed). Such automatic feed devices are preferably designed to automatically drive the power tool into the material to be processed without the need to use hand-operated devices such as rotary wheels, as was previously the case. In particular, such auto feed devices are used in conjunction with a drill stand that keeps the power tool in position during its operation. Such drill stands are known both for vertical applications, in which the power tool works into a substrate in a "downward" working direction, and for horizontal applications, in which a power tool is placed on a wall to be machined, for example to drill a hole in the wall. In the applications it is preferred in particular that a drill stand is used before the power tool or the system comprising the power tool and the auto-feed device is operated. The fastening of the drill stand to the wall takes place for example using a negative pressure or a vacuum, with which corresponding components of the drill stand are sucked onto the wall to be machined. It may also be preferred in the context of the invention to mount drill stands with anchors. Known drill stands comprise for example guide rails to which the auto-feed devices can be fastened and along which the auto-feed device can drive the power tool into the wall to be machined.

However, it has been shown that the use and assembly of a drill stand on a construction site can be cumbersome and time-consuming. An object on which the invention is based is therefore that of specifying a solution for how drilling with a diamond drilling device can be made easier. It would be desirable if the proposed solution could be used both for hand-held drilling devices and for column-guided drilling devices.

A disadvantage of using auto feed devices known from the prior art is that a drill stand is always required when drilling. In addition, the auto feed device is an additional device that makes the system used for drilling more complex, and therefore susceptible to errors.

It is also known in the prior art to assist the work of power tools with suction devices. For example, wet and/or dry vacuuming devices can be used to suck off material that has been removed—be it dry (dust) or wet (dust-water mixture)—and remove it from the area of the borehole. As a result of this removal, prescribed health and safety measures, with which it is intended for example to ensure that dust does not get into the respiratory tract of workers working with the power tool, are also implemented in particular. In addition, suction devices such as vacuuming devices can be used to keep the workplace clean. This may be very important for example in the case of restorations. In this connection, the use of vacuuming devices for dust control or the use of so-called water management systems (WMS) for wet applications is known in particular. A dust-water mixture may occur in particular whenever the tool of the power tool, for example the drill bit of a (diamond) drilling device, is cooled with water during operation. The cooling water then mixes with the material removed during drilling, the drilling dust, and forms the dust-water mixture. So far, in the case of conventional suction devices known from the prior art, the suction power or the negative pressure produced has only been used to suck up dust or a dust-water mixture.

The object on which the present invention is based is to overcome the disadvantages of the prior art described above and to provide a system comprising a power tool and a suction device in order to facilitate the drilling process for the user of the power tool or to assist the drilling or to make automatic drilling possible. In addition, it would be desirable if the invention could be used to propose an alternative technical solution for providing a cut assist function so that, although a feed force with which the power tool is driven into the wall or into the substrate is provided, this feed force is to be provided without an auto-feed device specifically intended for it.

According to the invention, a system which comprises a power tool and a suction device is provided. The system is characterized in that a tool of the power tool can be driven into a wall or into a substrate. In other words, it is preferred in the context of the invention that a negative pressure produced by the suction device can be used to drive the power tool into a wall or into a substrate. The negative pressure advantageously assists the user of the power tool in keeping the tool in a working position. Tests have shown that work with the usually very heavy power tools can be made considerably easier by the negative-pressure-based assistance.

The power tool may preferably be a core drilling device, which is used for example to drill large holes in a substrate or in a wall, often with cables and/or pipes later being passed through the holes created. The core drilling devices may be equipped with drill bits, which produce a drill core that usually has an essentially circular base area and is broken out of the substrate after the drilling work has been completed. The drill bits are often tipped with artificial diamonds or diamond fragments to improve the drilling performance of the drill bit.

The suction device may be for example a vacuuming device for dry or wet drilling applications or a water management system (WMS) for wet applications. In the context of the invention, suction devices preferably comprise a turbine that is driven by a motor. By means of the turbine, a negative pressure can be produced inside the suction device, while this negative pressure can preferably be used to suck up dust or a dust-water mixture that occurs when the power tool is in operation. The suction device and the power tool are preferably connected to one another with a suction hose. The sucked up dust or the sucked up water-dust mixture can be transported through this suction hose out of the working area of the power tool into the suction device. The negative pressure that is produced by the suction device can preferably also be referred to in the context of the invention as a "vacuum". The negative pressure is preferably transferred from the suction device into the working area of the power tool with the suction hose. For example, in a drill bit of a core drilling device there can be a negative pressure with which the dust or the spoil can be sucked out of the borehole.

It is preferred in the context of the invention that, for example in the case of hand-held drilling, pressing forces of the order of magnitude of 150 to 200 N are used. In the context of the present invention, these pressing forces are advantageously produced by a negative pressure that can preferably be adapted to the drill bit diameter. In particular, it is preferred that the negative pressure is so great that the drilling system can be pressed against the wall or pulled up to the substrate by the negative pressure.

It is preferred in the context of the invention that the proposed system comprising the power tool and the suction device manages without an auto-feed device, an auto-feed device usually being designed to drive a power tool or a tool of the power tool into a wall or a substrate. In the case of the present invention, the task of the usually present automatic feed device is advantageously taken over by the suction device or the negative pressure produced by the suction device. In the context of the invention, it is particularly preferred that the system manages without an auto-feed device with which the power tool can be driven into the wall or the substrate.

Tests have shown that, especially in the case of hand-held applications, often too little pressure may be applied by users to operate the power tools in the optimum performance range. Advantageously, with the proposed system an optimum drilling performance can be achieved with minimal drilling time, in particular irrespective of the individual capabilities of the worker with respect to physical strength and endurance. Another essential advantage of the invention is that the proposed system can be used both in the case of hand-held applications and in the case of column-guided applications.

According to one embodiment of the invention, it is preferred that the negative pressure of the suction device is designed to drive the tool or the power tool into the wall or into the substrate. This function of the negative pressure is preferably referred to in the context of the invention as "cut assist". The invention thus preferably relates to a hand-held drilling device with a cut assist function, the cut assist function operating on the basis of negative pressure. The force with which the power tool or the tool can be driven into the wall or the substrate is preferably referred to in the context of the invention as "feed force". In the context of the invention, it is particularly preferred that the suction device can control the feed force through the power of the suction device. This possibility of control is based in particular on the fact that the suction power of the suction device and the negative pressure produced by the suction device are related. For the purposes of the invention, it is preferred that the suction power of the suction device can be increased considerably in comparison with conventional suction devices that work together with power tools. In other words, a suction device with great suction power or suction strength is preferably used in the context of the present invention. This achieves the effect for example that the suction power of the suction device or the feed force with which the power tool is driven into a wall or into a substrate can be controlled or regulated in dependence on the drilling performance of the power tool. If for example the power tool is operated with high power and a large amount of spoil is to be expected, the suction power of the suction device can be adapted to this greater amount of spoil, this adaptation preferably taking place automatically within the system. Similarly, a suction power or a produced negative pressure can be reduced if the power tool is operated with a low work output and only small amounts of spoil per unit of time are to be expected. The adaptability of the suction power of the suction device to the operating power of the power tool is an essential accomplishment of the present invention. It is most particularly preferred in the context of the invention that the proposed system comprising the power tool and suction device is designed to keep the power tool at an ideal working point. As a result, the invention advantageously makes it possible to provide a performance that is significantly increased in comparison with conventional systems. It was completely surprising that a power tool or a tool of a power tool can be driven into a wall or into a substrate using the negative pressure of a suction device, whereby a vacuum-based cut assist function can surprisingly be provided with the proposed system.

According to a further embodiment of the invention, it is preferred that the power tool is designed to be kept in a working position on the wall or on the substrate by a negative pressure that can be produced by the suction device. This assistance for the worker is advantageously achieved by the negative pressure causing a holding force between the wall or the substrate on the one side and the power tool or the tool on the other side. It is preferred in the context of the invention that the holding force can be set in dependence on the operating or drilling performance of the power tool.

It is preferred in the context of the invention that the negative pressure can be set in dependence on a suction power of the suction device of the system. The suction power of the suction device can preferably be set using a communication link between the power tool and the suction device. The communication link may preferably be bluetooth-based. In particular, the communication may be wired and/or wireless. However, all other common communication technologies can also be used in the context of the present invention.

It is preferred in the context of the invention that a suction power of the suction device can be set. In other words, the suction device has an adjustable suction power. It is most particularly preferred that an optimum suction power in the power tool can be determined by a suitable method of determination. The result of this method of determination, i.e., the optimum suction power determined for a point in time t, is then preferably transmitted to the suction device and used as a control signal.

It is preferred in the context of the invention that a feed force with which the power tool can be driven into the wall or the substrate can be set using the communication link between the power tool and the suction device. Furthermore, a holding force with which the power tool can be kept on a wall or on a substrate can also be set or regulated or controlled using the communication link between the power tool and the suction device. For this purpose, the proposed system, in particular the communication link of the system, comprises a communication interface which is designed for communication with the power tool and/or the suction device. In particular, the communication interface is designed to regulate or set the suction power of the suction device, the feed force and/or a fastening force in dependence on an operating performance of the power tool. If the power tool is formed for example by a core drilling device, the operating performance of the power tool can preferably also be referred to as the drilling performance of the core drilling device.

It is preferred in the context of the invention that the system comprises a bellows for enlarging a surface area on which the negative pressure acts. This configuration of the invention may be advantageous in particular when the negative pressure of the suction device is used to keep the power tool or the tool in a working position on a wall or on a substrate. In particular, the surface area on which the substrate acts can be enlarged with the bellows, which is particularly advantageous when for example drill bits with small diameters are used. These small drill bits are in contact with the wall or the substrate over a comparatively small surface area, so that the negative pressure of the suction device that is transmitted into the interior of the drill bit with a suction hose can only act on this small area. As a result, under some circumstances it is necessary to work with very great negative pressures or high suction power levels of the suction device. Advantageously, the surface area on which they act, or the contact area, can be considerably enlarged by using or providing the bellows, so that it is possible to work with lower negative pressures. Tests have shown that the surface area on which they act on the wall or on the substrate can be kept constantly large by using a bellows, so that in the context of the present invention core drilling devices with drill bits of different diameters can be used. As an alternative to the bellows, any other area-enlarging means designed to enlarge the surface area on which the negative pressure produced by the suction device acts can be used.

In a further preferred configuration of the invention, the system comprises a water collecting ring, which can be fastened to the wall or the substrate with a negative pressure. The water collecting ring is preferably designed to keep against the wall or the negative pressure using the negative pressure and to collect water or the water/dust mixture. It is preferred in the context of the invention that the water collecting ring comprises additional driving means with which the power tool or the tool of the power tool can be driven into the wall or into the substrate. The additional driving means may preferably be formed as rollers. However, other mechanisms are also conceivable as driving means. It is particularly preferred in the context of the invention that the additional rollers that can be used for example as driving means are driven by an air flow, whereby the drill bit can advantageously be pressed into the wall or into the substrate. For example, the rollers may have fan wheels and/or turbines or be configured in this way. In this case, the driving means may be driven from the borehole to the suction device in the mixture of water, dust and/or air.

It is preferred in the context of the invention that the system comprises a drill stand with which the power tool can be kept in a working position. In particular, the power tool of the system can be kept in a working position by the drill stand. The power tool is preferably a hand-held power tool, which is also referred to in the context of the invention as a handheld power tool. It is most particularly preferred that the power tool is formed by a core drilling device and the tool of the power tool is formed by a drill bit.

It is particularly preferred in the context of the invention that the power tool can be driven into the wall or into the substrate in the context of the invention. The negative pressure produced by the suction device is preferably used for this driving in of the power tool or the tool of the power tool. The force with which it is driven in is preferably referred to in the context of the invention as the feed force. The corresponding function that can be provided with the proposed system is preferably referred to as the cut assist function. In this respect, the invention preferably also relates to a method for driving a power tool into a wall or into a substrate, comprising the following steps:

a) providing a power tool that is connected to a suction device,
b) producing a negative pressure with the suction device,
c) using the negative pressure to drive the power tool into the wall or into the substrate.

It is preferred in the context of the invention that the method comprises the additional step that a suction power of the suction device, a feed force with which the power tool can be driven into the wall or the substrate and/or a fastening force can be set using a communication link between the power tool and the suction device. In addition, it is preferred that the power tool and the suction device communicate with one another via a communication interface, so that the suction power of the suction device, the feed force and/or the fastening force can be regulated using the communication interface.

In a further aspect, the invention relates in particular to the use of the suction power of the suction device to suck the tool of the power tool firmly to the wall to be machined. In addition, the negative pressure produced by the suction device can be used to drive the power tool or the tool of the power tool into the wall or into the substrate in the sense of a cut assist function. The terms, definitions and technical advantages introduced for the system preferably apply analogously to the proposed methods and uses of the negative pressure.

Further advantages can be found in the following description of the figures. The figures, the description and the claims contain numerous features in combination. A person skilled in the art will expediently also consider the features individually and combine them to form useful further combinations.

DETAILED DESCRIPTION OF THE DRAWINGS

In the figures, identical and similar components are denoted by the same reference signs.

Figure 1:
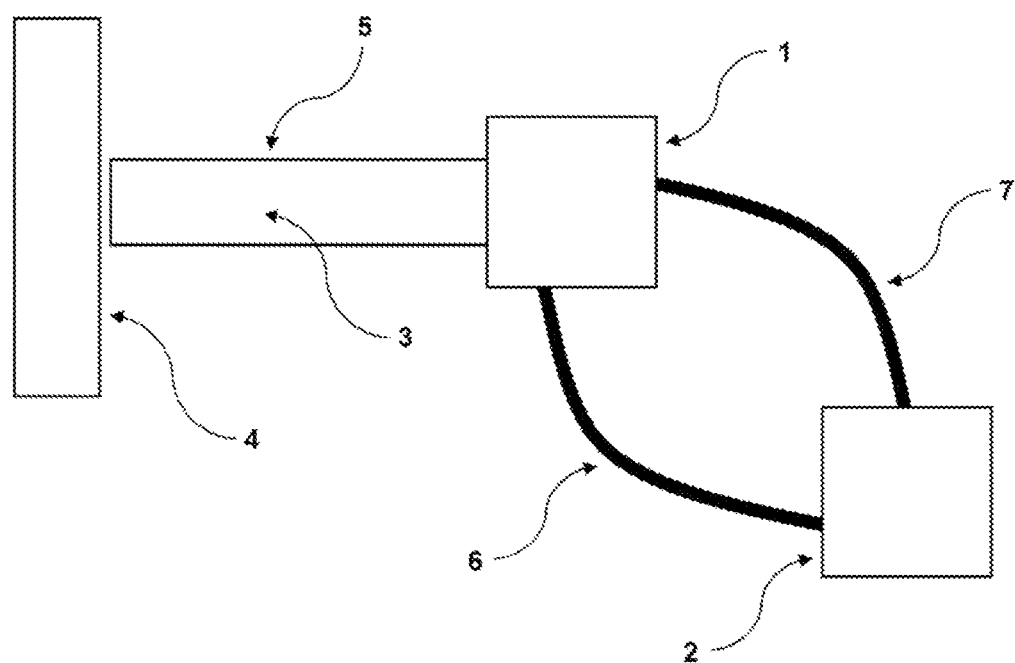
FIG. 1 shows a view of a preferred configuration of the proposed system.

FIG. 1 shows a preferred embodiment of the invention. In particular, FIG. 1 shows a preferred configuration of the proposed system, which comprises a power tool (1) and a suction device (2). The power tool (1) may preferably be a core drilling device, while the suction device (2) may be a vacuuming device or a water management system (WMS), which can be used in particular for wet applications. The power tool (1) comprises a tool (5), which may be for example a drill bit of a core drilling device. If the power tool (1) is a diamond core drilling device, the drill bit may for example be set with diamonds or diamond fragments.

The power tool (1) may be connected to the suction device (2) via a suction hose (6). With the suction hose (6), a negative pressure (3), which is produced in the suction device (2), can be transmitted into a working area of the power tool (1). It is preferred in the context of the invention that the suction hose (6) is designed to establish a flow-conducting connection between the area of the suction device (2) in which the negative pressure (3) is produced and the working area of the power tool (1). In particular, with the suction hose (6) a negative pressure (3) can be produced in the tool (5) of the power tool (1) or provided therein. With this negative pressure (3) the drilling dust or a dust-water mixture can be removed from the working area of the power tool (1). In the context of the present invention, it is proposed to use the already existing negative pressure (3) or the suction power of the suction device (2) for additional functions. These functions may be for example that, using the negative pressure (3), the power tool (1) is kept in a working position favorable for the user on a wall (4) or on a substrate (4). The negative pressure (3) may also be used to drive the power tool (1) or the tool (5) of the power tool (1) into the wall (4) or into the substrate (4) (cut assist function). For this purpose, the suction power that can be provided with the suction device (2) of the proposed system can be increased considerably in comparison with conventional suction devices (2).

It is particularly preferred in the context of the invention that the holding force and/or the feed force that can be produced by the suction device (2) of the system can be set or selected in dependence on the operating performance of the power tool (1). If the power tool (1) is a core drilling device, the operating performance of the power tool (1) may be for example a drilling performance. If for example the power tool (1) is operated at high power and it is to be expected that relatively large quantities of dust or of the dust-water mixture will be produced or occur, the feed force or the fastening force produced by the suction device (2) of the system can likewise be increased in order to allow the power tool (1) to be securely fastened to the wall (4) or to allow the power tool (1) to be driven in effectively. In other words, it is preferred that the holding force and/or the feed force produced by the suction device (2) can be adapted to the operating or drilling performance of the power tool (1). Such an adaptation of the holding force and/or the feed force to the operating or drilling performance of the power tool (1) can be achieved in particular by adapting the negative pressure (3) produced by the suction device (2). It is particularly preferred in the context of the invention that the fastening force and/or the feed force can be set by regulating the negative pressure (3) that is produced by the suction device (2) of the system. The negative pressure (3) produced by the suction device (2) or its magnitude preferably correlates with a suction power which can preferably be set on the suction device (2). In other words, the negative pressure (3) that is produced by the suction device (2) can be set in dependence on the suction power of the suction device (2). It is an essential accomplishment of the present invention that the negative pressure (3) that is always present and is produced by the suction device (2) of the system is used and exploited for a series of other functions.

It is particularly preferred in the context of the invention that the suction power of the suction device (2) can be set using a communication link (7). The communication link (7) is formed in particular between the power tool (1) and the suction device (2). For example, the communication link (7) may be designed as a bluetooth communication link. It is preferred in this connection that both the power tool (1) and the suction device (2) are bluetooth-enabled. However, other types of communication links are also conceivable in the context of the present invention. The communication link (7) advantageously allows the fastening force and/or the feed force as well as the negative pressure (3) produced by the suction device (2) to be set or adapted in dependence on the operating performance of the power tool (1). In particular, the communication link (7) allows communication between the power tool (1) and the suction device (2). It is preferred in the context of the invention that the communication link (7) is also used for exchanging further data, commands and/or information between the power tool (1) and the suction device (2).

The system preferably comprises a communication interface which preferably allows communication between the power tool (1) and the suction device (2). It is particularly preferred in the context of the invention that the communication interface is designed to establish the communication link (7) between the power tool (1) and the suction device (2). In other words, it is preferred in the context of the invention that the communication link (7) comprises a communication interface which is designed for communication with the power tool (1) and/or the suction device (2). As a result, the feed force with which the power tool (1) can be driven into the wall (4) or the substrate (4) can advantageously be set using the communication link (7). The communication interface is therefore designed to regulate the suction power of the suction device (2) and/or the feed force.

Figure 2:
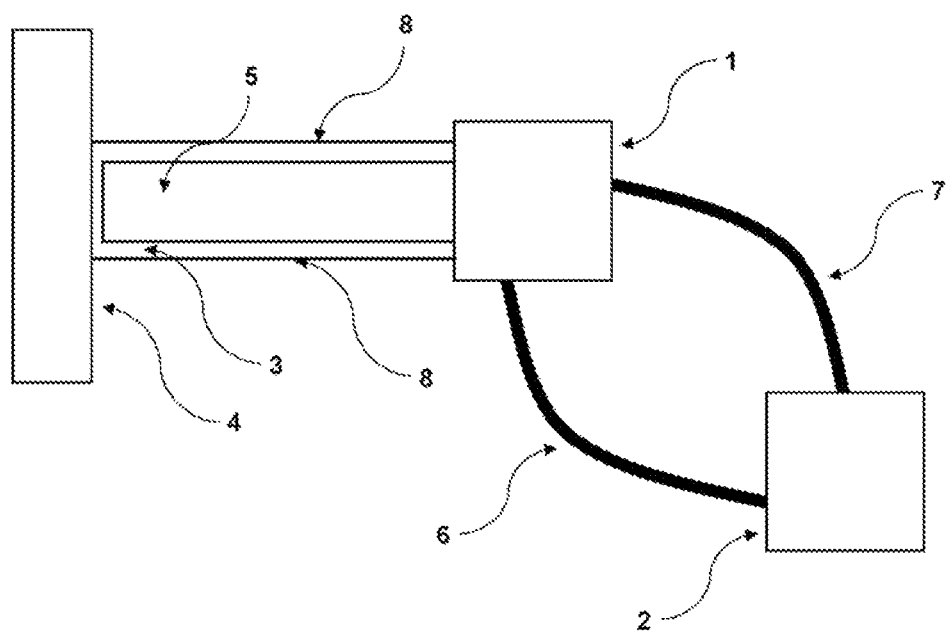
FIG. 2 shows a view of a preferred configuration of the proposed system with a bellows.

FIG. 2 shows a view of a preferred configuration of the proposed system with a bellows (8). It is preferred in the context of the invention that the bellows (8) serves in particular for enlarging the surface area on which the negative pressure (3) acts. Components of the bellows (8) preferably run essentially parallel to the tool (5) of the power tool (1) and contact the wall (4) or the substrate (4) that is to be machined with the power tool (1). In particular, the bellows (8) encloses the tool (5) of the power tool (1). At the points of contact between the bellows (8) and the wall (4) or substrate (4), a form fit is preferably formed, so that a closed space is formed between the bellows (8), the wall (4) or the substrate (4) and the tool (5) or the power tool (1). The negative pressure (3) that is produced by the suction device (2) and can be transferred from the suction device (2) to the power tool (1) with the suction hose (6) is also preferably present in this closed space formed inter alia by the bellows (8). The power tool (1) or the tool (5) can advantageously be driven into the substrate (4) or into the wall (4) by the negative pressure (3). However, the negative pressure (3) can advantageously also be used to fasten the power tool (1) to the wall (4) or to the substrate (4). In particular, the area on which the negative pressure (3) acts on the wall (4) is enlarged by the bellows (8). As a result, it is possible for example to work with a lower suction power of the suction device (2) or a lower negative pressure to be produced (3), which saves energy and costs.

Figure 3:
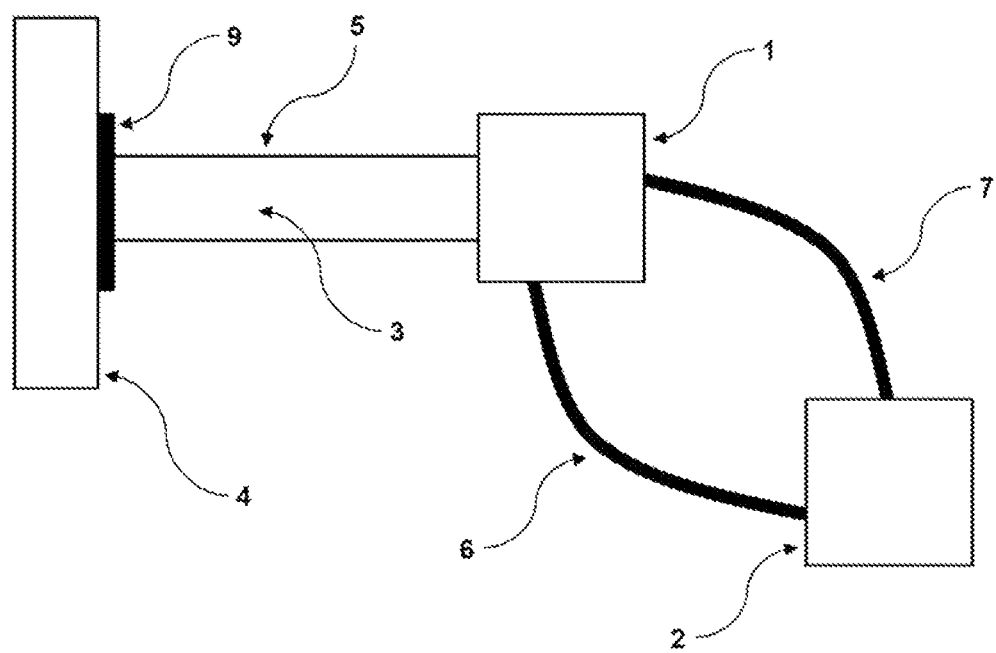
FIG. 3 shows a view of a preferred configuration of the proposed system with a water collecting ring.

FIG. 3 shows a view of a preferred configuration of the proposed system with a water collecting ring (9). It is preferred in the context of the invention that the water collecting ring (9) can be fastened to the wall (4) or the substrate (4) with a negative pressure (3). The water collecting ring (9) preferably has driving means with which the power tool (1) or the tool (5) of the power tool (1) can be driven into the wall (4) or into the substrate (4). The water collecting ring (9) can preferably assist the cut assist function of the proposed system. The driving means may be designed for example as rollers. It is preferred in the context of the invention that the water collecting ring (9) is arranged between the wall (4) or the substrate (4) on one side and the tool (5) of the power tool (1) on the other side. The water collecting ring (9) is preferably designed to collect the dust-water mixture formed from cooling water and drilling dust in the case of wet applications, while the dust-water mixture collected can preferably be sucked off with the suction device (2).

LIST OF REFERENCE CHARACTERS

1 Power tool
2 Suction device
3 Negative pressure
4 Wall or substrate
5 Tool of the power tool
6 Suction hose
7 Communication link
8 Bellows
9 Water collecting ring

The invention claimed is:

1. A system, comprising:
a power tool;
a suction device;
a suction hose connected to the power tool and the suction device;
a water collecting ring which is fastenable to a wall or to a substrate with a negative pressure produced by the suction device and transmitted via the suction hose, wherein a dust-water mixture formed from cooling water and drilling dust is collectable by the water collecting ring and wherein the water collecting ring includes a driver;
wherein the power tool is drivable into the wall or into the substrate by the negative pressure produced by the suction device and by the driver of the water collecting ring; and
a communication link formed between the power tool and the suction device, wherein data and/or a command and/or information is exchangeable between the power tool and the suction device via the communication link.

2. The system as claimed in claim 1, wherein the negative pressure is settable in dependence on an operating performance of the power tool.

3. The system as claimed in claim 1, wherein the negative pressure is settable using the communication link between the power tool and the suction device.

4. The system as claimed in claim 3, wherein the communication link comprises a communication interface which is configured to establish the communication link between the power tool and the suction device.

5. The system as claimed in claim 3, wherein the communication link is a bluetooth communication link.

6. The system as claimed in claim 1, wherein a feed force with which the power tool is drivable into the wall or into the substrate is settable using the communication link between the power tool and the suction device.

7. The system as claimed in claim 1, further comprising a bellows which enlarges a surface area on which the negative pressure acts.

8. The system as claimed in claim 1, wherein the driver is configured as rollers.

9. The system as claimed in claim 1, wherein the system does not include an auto-feed device with which the power tool is drivable into the wall or into the substrate.

10. A method for driving a power tool into a wall or into a substrate, comprising the steps of:
exchanging data and/or a command and/or information between the power tool and a suction device via a communication link formed between the power tool and the suction device;
driving the power tool into the wall or into the substrate by using a negative pressure produced by the suction device, wherein the suction device is connected to the power tool via a suction hose, and by a driver of a water collecting ring, wherein the water collecting ring is fastened to the wall or to the substrate with the negative pressure produced by the suction device; and
collecting a dust-water mixture formed from cooling water and drilling dust by the water collecting ring.

11. The method as claimed in claim 10, wherein the driver is configured as rollers.

12. The method as claimed in claim 10, wherein the exchanging the data and/or the command and/or the information between the power tool and the suction device via the communication link sets the negative pressure using the communication link.

13. A system, comprising:
a power tool;
a suction device; and
a water collecting ring which is fastenable to a wall or to a substrate with a negative pressure produced by the suction device, wherein a dust-water mixture formed from cooling water and drilling dust is collectable by the water collecting ring and wherein the water collecting ring includes a driver;
wherein the power tool is drivable into the wall or into the substrate by the negative pressure produced by the suction device and by the driver of the water collecting ring;
wherein the negative pressure is settable using a communication link between the power tool and the suction device;
wherein the communication link is a bluetooth communication link.

* * * * *